United States Patent
Lee et al.

(10) Patent No.: US 9,185,337 B2
(45) Date of Patent: Nov. 10, 2015

(54) DEVICE AND METHOD FOR MAKING QUICK CHANGE TO PLAYBACK MODE AFTER PHOTOGRAPHING SUBJECT

(71) Applicant: SAMSUNG ELECTRONICS CO., LTD., Suwon-si, Gyeonggi-do (KR)

(72) Inventors: I-saac Lee, Daejeon (KR); Seong-hyun Kim, Seoul (KR); Jae-gun No, Hwaseong-si (KR); Hae-sung Oh, Seoul (KR); Jae-hun Jeong, Gwangmyeong-si (KR); Hyung-ok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 14/186,418

(22) Filed: Feb. 21, 2014

(65) Prior Publication Data

US 2015/0062375 A1    Mar. 5, 2015

(30) Foreign Application Priority Data

Aug. 30, 2013    (KR) ......................... 10-2013-0104513

(51) Int. Cl.
*H04N 5/91*    (2006.01)
*H04N 1/21*    (2006.01)
*H04N 5/232*    (2006.01)

(52) U.S. Cl.
CPC . *H04N 5/91* (2013.01); *H04N 1/21* (2013.01); *H04N 1/2104* (2013.01); *H04N 1/2158* (2013.01); *H04N 1/2195* (2013.01); *H04N 5/23293* (2013.01)

(58) Field of Classification Search
CPC ... H04N 5/91; H04N 5/23293; H04N 1/2104; H04N 1/21; H04N 1/2108; H04N 1/2112; H04N 1/2116; H04N 1/212; H04N 1/2125; H04N 1/2129; H04N 1/2137; H04N 1/2141; H04N 1/2166; H04N 1/2195
See application file for complete search history.

(56) References Cited

U.S. PATENT DOCUMENTS 5,440,401 A *    8/1995    Parulski et al. ............... 386/225
8,897,602 B2 *   11/2014    Bhrugumalla ................ 382/298

(Continued)

FOREIGN PATENT DOCUMENTS

KR    1999-012651 A    2/1999
KR    10-2005-0087285 A    8/2005

OTHER PUBLICATIONS

Extended European Search Report issued for related application EP 14157906.0, Sep. 18, 2015, 8 pages.

*Primary Examiner* — Pritham Prabhakher
(74) *Attorney, Agent, or Firm* — Drinker Biddle & Reath LLP (57) ABSTRACT

A device includes a photographing unit, an image processing unit, a buffer, a storage unit, and a digital signal processor. The buffer stores index information to be assigned to at least one image signal obtained by the photographing unit, file name and storage path information to be provided to the at least one image signal when the at least one image signal is stored in the storage unit. The digital signal processor displays the most recently stored image signal when a display input instruction to display a currently captured image is received, searches the storage unit when an input instruction to display previously-captured images is additionally received, if a corresponding image file is found in the storage unit, displays the found image file, and if the corresponding image file is not found in the storage unit, displays an image signal stored in the buffer using the index information.

16 Claims, 5 Drawing Sheets

(56) References Cited

U.S. PATENT DOCUMENTS

| | | |
|---|---|---|
| 2003/0090585 A1 | 5/2003 | Anderson |
| 2003/0122952 A1 | 7/2003 | Kuroiwa |
| 2005/0168577 A1* | 8/2005 | Karasaki et al. ........... 348/207.2 |
| 2005/0190270 A1 | 9/2005 | Park |
| 2005/0212943 A1* | 9/2005 | Karasaki et al. ......... 348/333.02 |
| 2005/0216435 A1* | 9/2005 | Lee ................................... 707/1 |
| 2006/0227223 A1* | 10/2006 | Nagata ....................... 348/231.5 |
| 2006/0245739 A1* | 11/2006 | Nagaoka et al. .............. 386/117 |
| 2007/0146504 A1* | 6/2007 | Morimoto et al. ......... 348/231.3 |
| 2009/0273686 A1 | 11/2009 | Kaikumaa et al. |
| 2010/0265351 A1* | 10/2010 | Kaibara .................... 348/222.1 |
| 2011/0110592 A1* | 5/2011 | Wada ........................... 382/182 |
| 2011/0306389 A1 | 12/2011 | Nagayama |
| 2013/0120591 A1* | 5/2013 | Bednarczyk et al. ...... 348/207.1 |

\* cited by examiner

DEVICE AND METHOD FOR MAKING QUICK CHANGE TO PLAYBACK MODE AFTER PHOTOGRAPHING SUBJECT

CROSS-REFERENCE TO RELATED PATENT APPLICATIONS

This application claims the priority benefit of Korean Patent Application No. 10-2013-0104513, filed on Aug. 30, 2013, in the Korean Intellectual Property Office, the disclosure of which is incorporated herein in its entirety by reference.

BACKGROUND

1. Field

One or more embodiments of the invention relate to an electronic apparatus (e.g., an image photographing apparatus), and more particularly, to a method and an apparatus for rapidly reproducing a captured image after the apparatus photographs a subject.

2. Description of the Related Art

As performance of an image photographing apparatus is improved so that high-speed continuous photographing and infinite continuous photographing may be performed, a change to a playback mode may be made after an image is completely stored. Thus, a captured image may not be checked until the image is completely stored.

SUMMARY

One or more embodiments are provided so that when a user desires to rapidly view a captured image in a playback mode after photographing a subject, the captured image is displayed on a screen by using information stored in a database in a buffer even before a still image or continuous photographing images captured by a photographing unit are stored in a memory.

Additional aspects will be set forth in part in the description which follows and, in part, will be apparent from the description, or may be learned by practice of the presented embodiments.

According to one or more embodiments, a device for making a quick change to a playback mode after photographing a subject includes a photographing unit, an image processing unit, a storage unit, a buffer, and a digital signal processing unit. The photographing unit obtains at least one image signal of the subject. The image processing unit performs image processing on the at least one image signal. The buffer stores the at least one image signal while the image processing is performed by the image processing unit. The storage unit compresses the at least one processed image signal stored in the buffer, provides a file name to the at least one compressed image signal, and stores the at least one compressed image signal provided with the file name when the image processing is completed by the image processing unit. The buffer includes a database that manages and stores index information on the at least one image signal obtained by the photographing unit, and file name and storage path information to be provided to the at least one image signal when the at least one image signal is stored in the storage unit. The digital signal processing unit displays the most recently stored image signal of the at least one image signal stored in the buffer on a screen when a display input instruction to display a currently captured image during photographing is received. When an input instruction to display images captured prior to the currently captured image is additionally received, the digital signal processing unit searches the storage unit. If a corresponding image file is found in the storage unit, the digital signal processor loads the found image file to display on the screen. If the corresponding image file is not found in the storage unit, the digital signal processor loads an image signal stored in the buffer to display the loaded image signal on the screen using the index information stored in the database.

The digital signal processing unit may transmit the most recently stored image signal of the at least one image signal stored in the buffer when a transmit input instruction to transmit the currently captured image during photographing is received.

The digital signal processing unit may transmit the most recently stored image signal of the at least one image signal stored in the buffer to another device using wireless communication.

While the digital signal processing unit searches the database in the buffer or the storage unit and loads the stored image signal or the found image file to display on the screen, the storage unit may compress the at least one image signal stored in the buffer, provide a file name to the at least one compressed image signal, and store the at least one compressed image signal provided with the file name, when image processing is completed by the image processing unit.

When the display input instruction is received, the digital signal processing unit searches whether the link information corresponding to the currently captured image exists in the database in the buffer. If the link information exists in the database in the buffer, the digital signal processing unit loads the image signal provided with the file name, which is stored in the storage unit, to display the loaded image signal provided with the file name on the screen.

When the input instruction to display captured images prior to the currently captured image is additionally received, the digital signal processing unit loads the corresponding image file from the storage unit to display on the screen.

The display input instruction may include selection of a playback mode.

The database may store link information between the index information and the file name and storage path information to be provided to the at least one image signal, when the image signal is stored in the storage unit.

The digital signal processing unit may search whether the link information exists in the database in the buffer. If the link information exists in the database, the digital signal processing unit may load the image signal provided with the file name, which is stored in the storage unit, and display the loaded image signal provided with the file name on the screen. If the link information does not exist in the database, the digital signal processing unit may display the image signal stored in the buffer on the screen.

The device may be a camera.

According to one or more embodiments, a device includes a photographing unit, an image processing unit, a buffer, a storage unit, and a digital signal processing unit. The photographing unit continuously captures images via a continuous photographing signal in a continuous photographing mode at predetermined intervals. The image processing unit performs image processing on the captured images. The buffer stores the captured images while image processing is performed by the image processing unit. The storage unit compresses the processed images, provides file names to the compressed, and stores the compressed images provided with the file names, when image processing is completed by the image processing unit. The buffer includes a database for managing and storing index information on the images captured by the photographing unit, and file name and storage path information to be provided to the images when the images are stored in the storage unit. The digital signal processing unit displays the most recently captured image of the images stored in the buffer on a screen when a display input instruction to display a currently captured image during photographing is received. When an input instruction to display images captured prior to the currently captured image is additionally received, the digital signal processing unit searches the storage unit. If a corresponding image file is found in the storage unit, the digital signal processor loads the found image file to display on the screen. If the corresponding image file is not found in the storage unit, the digital signal processor loads an image signal stored in the buffer to display on the screen using the index information stored in the database.

The digital signal processing unit may transmit the most recently stored image of the images stored in the buffer when a transmit input instruction to transmit the currently captured image during photographing is received.

The digital signal processing unit may transmit the most recently stored image of the images stored in the buffer to another device using wireless communication.

While the digital signal processing unit searches the database in the buffer or the storage unit in accordance with the input instruction, the storage unit may compress the images stored in the buffer, provide file names to the compressed images, and store the compressed images provided with the file names, when the image processing is completed by the image processing unit.

The database may store link information between the index information and the file name and storage path information to be provided to the images, when the images are stored in the storage unit.

The digital signal processor may search whether the link information exists in the database in the buffer. If the link information exists in the data base, the digital signal processor may load the images provided with the file names, which are stored in the storage unit, to display the loaded images provided with the file names on the screen. If the link information does not exist in the database, the digital signal processing unit may display the images stored in the buffer on the screen.

According to one or more embodiments, a method of making a quick change to a playback mode after a device photographs a subject includes: obtaining, by a photographing unit, at least one image signal of the subject; performing, by an image processing unit, image processing on the at least one image signal; storing, in a buffer, the at least one image signal while image processing is performed by the image processing unit; compressing, by a storage unit, the at least one processed image signal stored in the buffer; providing, by the storage unit, a file name to the at least one compressed image signal; storing, in the storage unit, the at least one compressed image signal provided with the file name when the image processing is completed by the image processing unit; and managing and storing, in a database in the buffer, index information on the at least one image signal obtained by the photographing unit, and file name and storage path information to be provided when the at least one image signal having the corresponding index information is stored in the storage unit. The method further includes: displaying, by a digital signal processing unit, the most recently stored image signal of the at least one image signal stored in the buffer on a screen when a display input instruction to display a currently captured image during photographing is received; searching, by the digital signal processor, the storage unit when an input instruction to display images captured prior to the currently captured image is additionally received; if a corresponding image file is found in the storage unit, loading the image file to display on the screen; and if the corresponding image file is not found in the storage unit, loading an image signal stored in the buffer to display on the screen using the index information of the database.

The method may further include, transmitting, by the digital signal processing unit, the most recently stored image signal of the at least one image signal stored in the buffer when a transmit input instruction to transmit the currently captured image during photographing is received.

The method may further include, transmitting, by the digital signal processing unit, the most recently stored image signal of the at least one image signal stored in the buffer to another device using wireless communication.

While the searching step is performed by the digital signal processing unit, the method may further include: compressing, by the storage unit, the at least one image signal stored in the buffer; providing, by the storage unit, a file name to the at least one compressed image signal; and storing, in the storage unit, the at least one compressed image signal provided with the file name when the image processing is completed by the image processing unit.

When the input instruction to display image captured prior to the currently captured image is received, the method may include searching whether link information exists in the database in the buffer; if the link information exists in the database, loading the image signal provided with the file name, which is stored in the storage unit, and displaying the loaded image signal provided with the file name on the screen; and if the link information does not exist in the database, displaying the image signal stored in the buffer on the screen.

According to one or more embodiments, a method of making a quick change to a playback mode after a device photographs a subject includes: continuously capturing images, by a photographing unit, via a continuous photographing signal in a continuous photographing mode at predetermined intervals; performing, by an image processing unit, image processing on the captured images; storing, in a buffer, the captured images while image processing is performed by the image processing unit; compressing, by a storage unit, the processed images; storing, in the storage unit, the compressed images when image processing is completed by the image processing unit; and storing, in a database in the buffer, index information on the images captured by the photographing unit, and file name and storage path information to be provided to the images when the images are stored in the storage unit. The method further includes: displaying, by a digital signal processing unit, the most recently stored image of the images stored in the buffer on a screen when a display input instruction to display a currently captured image during photographing is received; searching, by the digital signal processing unit, the storage unit when an input instruction to display images captured prior to the currently captured image is additionally received; if a corresponding image file is found in the storage unit, loading the image file to display on the screen; and if the corresponding image file is not found in the storage unit, loading an image signal stored in the buffer to display on the screen using the index information of the database.

According to one or more embodiments, it is possible to solve a problem where, after high-speed continuous photographing or infinite continuous photographing is performed, a change to a playback mode may be made after an image is completely stored so that a currently captured image and another previously captured image cannot not be checked until the image is completely stored.

In addition, it is possible to provide an interface so that the user may rapidly check a desired image immediately after capturing a still image or continuous photographing images.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
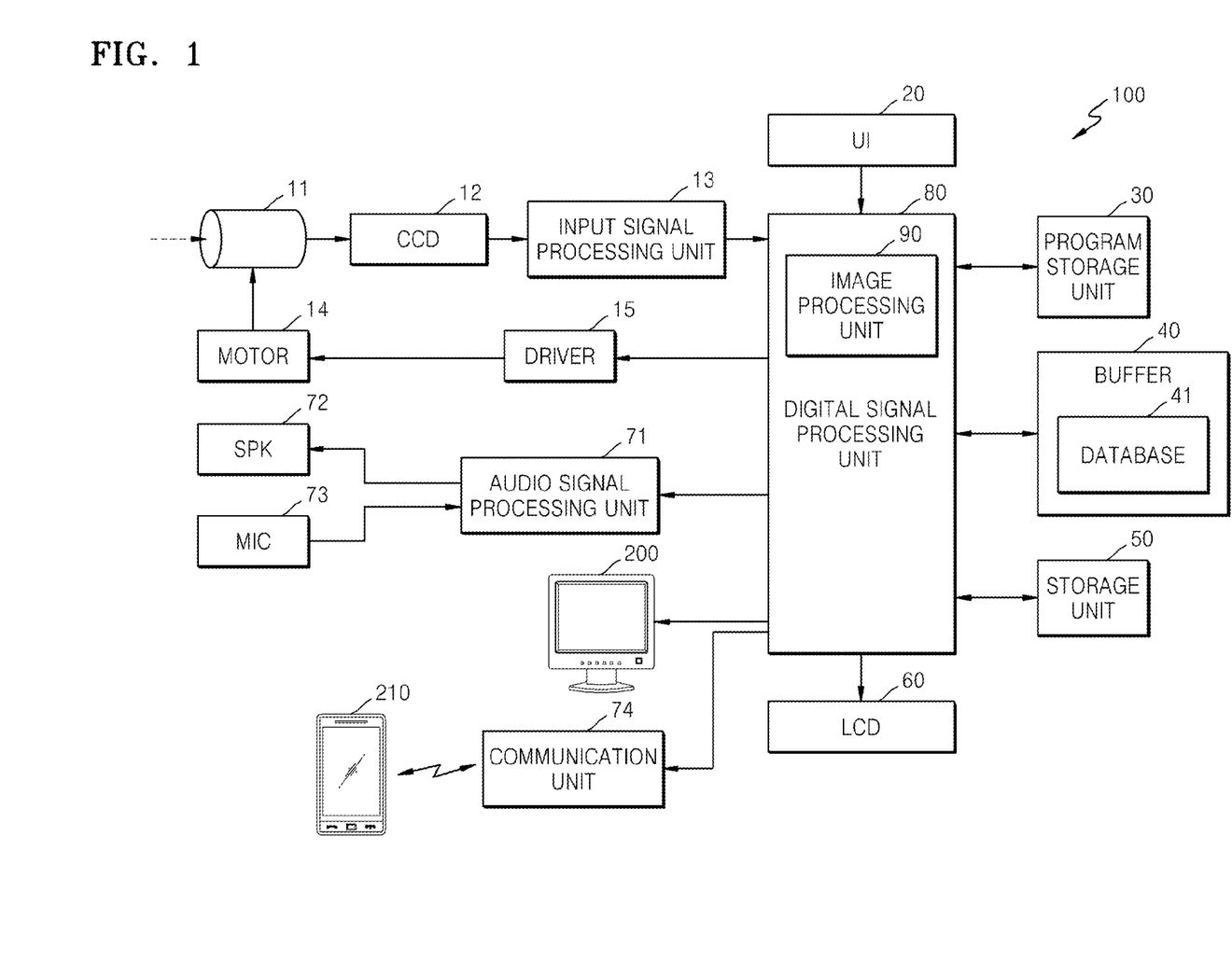
FIG. 1 is a block diagram illustrating a structure of a digital camera as an example of an electronic device, according to an embodiment.

FIG. 1 is a block diagram illustrating a structure of a digital camera 100 as an example of an electronic device, according to an embodiment. Although a digital camera is shown in FIG. 1, the electronic device may include video cameras, mobile phones, PDAs and other devices having image capturing capabilities.

Referring to FIG. 1, the digital camera 100 includes an optical unit 11 for inputting an optical signal from a subject, a charge coupled device (CCD) 12 for converting the optical signal input through the optical unit 11 into an electrical signal, an input signal processing unit 13 for performing signal processing (e.g., noise reduction processing and digital signal processing) on the electrical signal provided by the CCD 12, a motor 14 for driving the optical unit 11, and a driver 15 for controlling an operation of the motor 14.

In addition, the digital camera 100 may include an user input unit such as a user interface (UI) 20 for inputting an input signal of a user, a program storage unit 30 for temporarily storing data of an input image, data for operation processing, and a processing result, a buffer 40 for storing an algorithm and configuration data required for an operation of the digital camera 100, and a storage unit 50 as a recording apparatus for storing an image file. A secure digital (SD) card, a compact flash (CF) card, and a smart media (SM) card may be used as the storage unit 50.

A liquid crystal display (LCD) 60 may be a display device that is mounted on the digital camera 100. In addition, the digital camera 100 may include an audio signal processing unit 71 for converting sound into a digital signal or converting a digital signal of a sound source into an analog signal and generating an audio file, a speaker (SPK) 72 for outputting sound, and a microphone (MIC) 73 for receiving sound.

The digital camera 100 may include a communication unit 74 for transmitting and receiving data, which may include at least one of a still image, a moving picture, audio, and multimedia, between the digital camera 100 and another device 210 (e.g., a mobile phone).

The digital camera 100 includes a digital signal processing unit 80 for controlling the operation of the digital camera 100.

The respective elements in FIG. 1 will be described in more detail below.

The optical unit 11 may include a lens for transmitting an optical signal, an aperture for controlling an amount of light in the optical signal, and a shutter for controlling an input of the optical signal. The lens includes a zoom lens for controlling an angle of view that may be reduced or increased in accordance with focal length, and a focus lens for focusing on a subject. Each of the lenses may be formed of one lens or may be formed of a group or a plurality of lenses. A mechanical shutter, in which an aperture is opened or closed, may be used as the shutter. Instead of a separate shutter, supply of an electrical signal to the CCD 12 may be controlled so that the CCD 12 may function as an electronic shutter.

The motor 14 for driving the optical unit 11 may control a position of the lens, the opening or closing of the aperture, and an operation of the shutter and the like so as to perform autofocus (AF), automatic exposure control (AEC), aperture adjustment, zooming, focus changing, and the like.

The motor 14 is controlled by the driver 15. The driver 15 controls the operation of the motor 14 in accordance with a control signal input from the digital signal processing unit 80.

The CCD 12 receives the optical signal input from the optical unit 11 to generate an image of the subject. A complementary metal oxide semiconductor (CMOS), a sensor array, and a CCD sensor array may be used as the CCD 12.

The input signal processing unit 13 may further include an analog-to-digital (A/D) converter for digitizing the electrical signal that is provided by the CCD 12 as an analog signal. In addition, the input signal processing unit 13 may include a circuit for performing signal processing on the electrical signal supplied by the CCD 12, for example, controlling a gain or shaping a waveform of the electrical signal supplied by the CCD 12.

The UI 20 may include a member enabling a user to manipulate the digital camera 100 or to perform various configurations during photographing. For example, the UI 20 may be implemented in various forms such as a button, a key, a touch panel, a touch screen, or a dial and may input a user control signal such as a signal for power on/off, photographing start/stop, reproduction start/stop/search, optical system driving, mode conversion, menu manipulation, or selection manipulation.

The program storage unit 30 may temporarily store RAW data (RGB data) of an image provided by the input signal processing unit 13. An image processing operation may be performed on the temporarily stored RAW data in accordance with an operation of the digital signal processing unit 80, or the temporarily stored RAW data may be transmitted to another element that requires the RAW data. In addition, data used to configure an algorithm stored in the buffer 40 may be converted into executable data to be temporarily stored in the program storage unit 30.

The data stored in the program storage unit 30 may be operation processed by the digital signal processing unit 80 so that an operation in accordance with the algorithm may be performed. Image data obtained by decompressing and converting an image file stored in the buffer 40 may be temporarily stored. The temporarily stored image data is transmitted to the LCD 60 and the image derived from the temporarily stored image data may be displayed. For example, various volatile memories that temporarily store data during power supply may be used as the program storage unit 30. A semiconductor device in which a plurality of memory elements are integrated with each other may be used as the program storage unit 30.

The buffer 40 may store an operating system (OS), an application program required for operating the digital camera 100, and data for executing an algorithm of a controlling method according to one or more embodiments. For example, various non-volatile memories such as a read only memory (ROM) may be used as the buffer 40.

According to an embodiment, the program storage unit 30 and the buffer 40 may be united into one element.

An image signal generated by compressing the image data provided by the input signal processing unit 13 may be recorded in the storage unit 50. For example, a hard disk drive (HDD), an optical disk, a magneto-optical disk, or a holographic data memory may be used as the storage unit 50.

According to the present embodiment, while image processing is completed by an image processing unit 90, the image signal stored in the buffer 40 is compressed, provided with a file name, and stored in the storage unit 50 such as the HDD, the optical disk, the magneto-optical disk, and the holographic data memory. The image signal may be reversibly or irreversibly compressed. For example, the image signal may be compressed according to the joint photographic experts group (JPEG) or JPEG 2000 standard.

Figure 3:
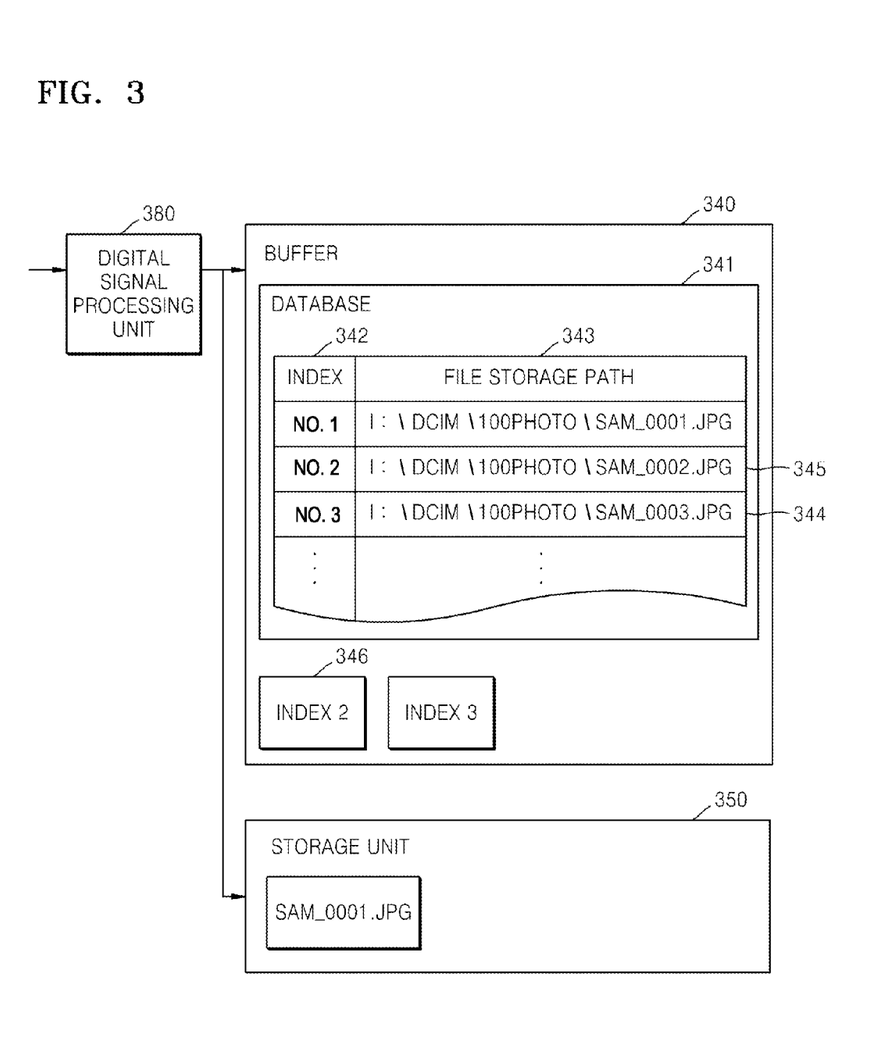
FIG. 3 is a block diagram illustrating internal components of a digital signal processing unit that control a buffer and a storage unit, according to an embodiment.

Referring to FIG. 3, according to an embodiment, a buffer 340 (FIG. 3) may further include a database 341. The database 341 stores index information to be assigned to at least one image signal obtained by the CCD 12 and file name and storage path information to be provided to the image signal when the image signal is stored in the storage unit 350.

For example, when three image signals are obtained by the CCD 12, information items such as an index number 1, a file name "SAM_0001.JPG", and a file storage path "I:\DCIM\100PHOTO\SAM_0001.JPG" are to be provided to an initially obtained image signal. Information items such as an index number 2, a file name "SAM_0002.JPG", and a file storage path "I:\DCIM\100PHOTO\SAM_0002.JPG" are to be provided to a next obtained image signal. Information items such as an index number 3, a file name "SAM_0003.JPG", and a file storage path "I:\DCIM\100PHOTO\SAM_0003.JPG" are to be provided to a finally obtained image signal.

The image processing unit 90 (FIG. 1) processes the image signal assigned with an "index number 1" and then, a digital signal processing unit 380 stores the processed image signal in a storage location "I:\DCIM\100PHOTO\SAM_0001.JPG" in a storage unit 350 (FIG. 3), tagging with the file name "SAM_0001.JPG".

In this process, the digital signal processing unit 380 performs a compression of the processed image signal, turning the "index number 1" image signal into a final format, such as JPG, before being stored and placed in the position "I:\DCIM\100PHOTO\SAM_0001.JPG" in the storage unit 350 with the file name "SAM_0001.JPG".

According to the present embodiment, when a playback request is made by a user before image compression is completed, the digital signal processing unit 380 determines whether the file "SAM_0001.JPG" exists in the storage unit 350. When image compression is not completed so that the file "SAM_0001.JPG" is not generated in the storage unit 350, the digital signal processing unit 380 searches the database 341 in the buffer 340 to load the "index number 1" image signal corresponding to the file name "SAM_0001.JPG" and to display the loaded "index number 1" image signal on a screen.

According to the present embodiment, the digital signal processing unit 380 compresses at least one image signal is processed by the image processing unit 90 (FIG. 1), provides a file name to the corresponding compressed image signal, and stores the compressed image signal provided with the file name while determining whether the corresponding image is in the storage unit 350 (FIG. 3) in accordance with the reproduction request of the user.

According to another embodiment, the database 341 may further include information about whether the processed image signal is compressed and stored in the storage unit 350 (other than index information) to be provided to at least one image signal obtained by the CCD 12, and file name and storage path information to be provided to the image signal when the image signal is stored in the storage unit 350.

In this case, when a reproduction request is made by a user before image compression is completed, the digital signal processing unit 380 loads a file stored in the storage unit 350 and displays the loaded file on a screen with reference to the database 341 when the corresponding file is stored in the storage unit 350.

When the corresponding file is not stored in the storage unit 350, the digital signal processing unit 380 loads an image signal corresponding to index information stored in the buffer 340 and displays the loaded image signal on a screen with reference to the database 341.

According to another embodiment, the database 341 (FIG. 3) may generate a first continuous photographing image in a continuous photographing mode, may generate a first name of the first continuous photographing image in accordance with digital rights management (DRM) contents file (DCF) rules, may generate a second name of a second continuous photographing image next to the first continuous photographing image in accordance with the DCF rules, may generate first continuous photographing number information that represents a continuous photographing order of the first continuous photographing image, and may generate a first file including the first name and the first continuous photographing number information.

The LCD 60 may display an image corresponding to the image data provided by the input signal processing unit 13 in real time or may display an image corresponding to image data restored from an image file stored in the storage unit 50. According to the present embodiment, the LCD 60 is illustrated. However, the invention is not limited to the above and an organic light emitting display device (OLED) and an electrophoretic display device may be used.

The audio signal processing unit 71 converts a digital signal of a sound source provided by the digital signal processing unit 80 into sound, amplifies the sound, transmits the amplified sound to the speaker 72, and outputs the sound. The audio signal processing unit may receive sound through the microphone 73, may convert the sound into a digital signal, may compress the digital signal, and may generate an audio file. The audio signal processing unit may transmit the audio file to the digital signal processing unit 80 so that the audio file may be processed.

The digital signal processing unit 80 may reduce noise of input image data through the image processing unit 90 and may perform image processing on the input image data, such as gamma correction, color filter array interpolation, color matrix processing, color correction, and color enhancement.

In addition, the processed image data may be compressed so that an image file may be generated. Image data may be restored from the image file.

In addition, the image processing unit 90 may functionally perform unsharp masking, color processing, blur processing, edge enhancement processing, image interpretation processing, image recognition processing, and image effect processing. Scene recognition processing may be performed as the image recognition processing. In addition, the image processing unit 90 may perform display image processing for displaying an image on the LCD 60. For example, brightness level control, color correction, contrast control, outline enhancement control, screen division, character image generation, and image composition may be performed.

The digital signal processing unit 80 may be connected to an external monitor 200 to perform an image processing operation so that an image is displayed on the external monitor 200. The digital signal processing unit 80 may transmit the processed image data so that the corresponding image is displayed on the external monitor 200.

The digital signal processing unit 80 may perform the above-described image processing and may control the respective elements in accordance with the processing result. In addition, the digital signal processing unit 80 may control the respective elements in accordance with the control signal of the user input through the UI 20. An algorithm for performing the image processing is stored in the buffer 40, may be converted into executable data for operational processing, and may be stored in the program storage unit 30 so that the digital signal processing unit 80 may perform the corresponding operation.

The communication unit 74 supports data communications between the digital camera 100 and the other device 210. The communication unit 74 may include a broadcast receiving module, a mobile communication module, a wireless Internet module, a short distance communication module, and a global positioning system (GPS).

Figure 2:
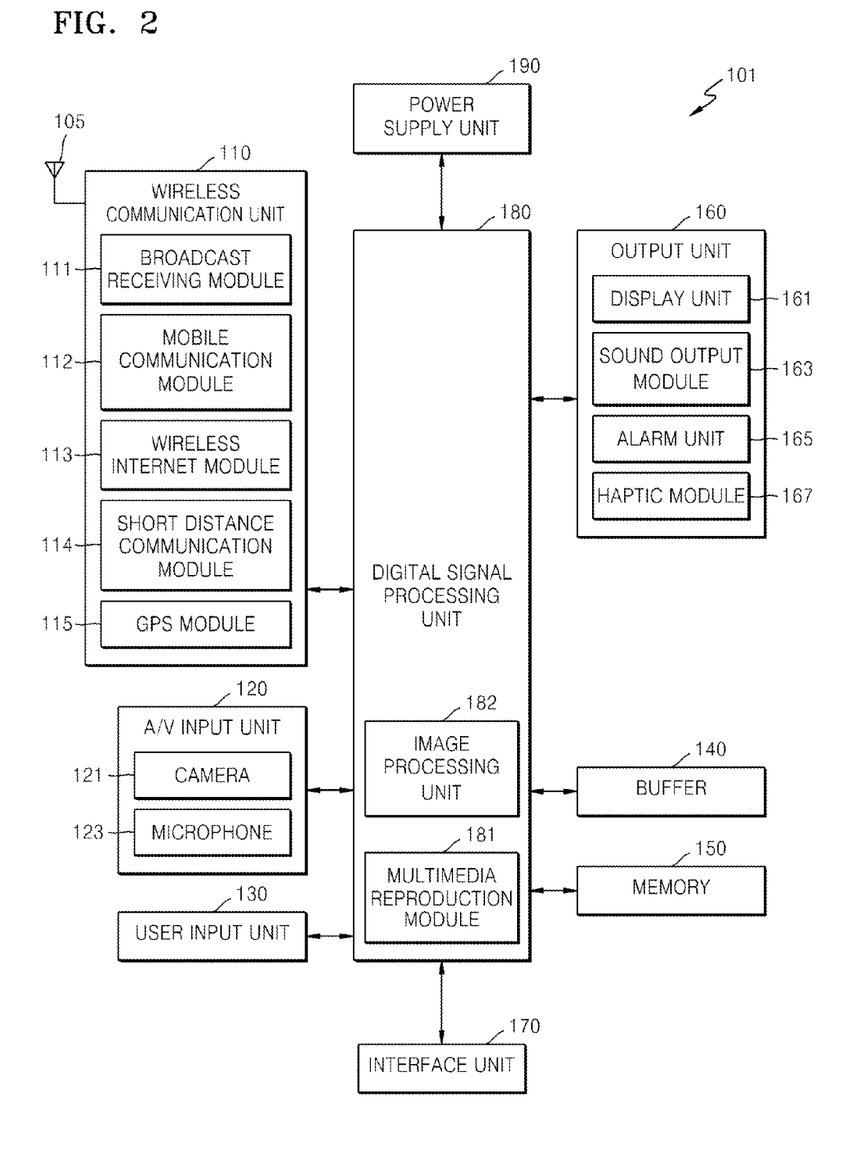
FIG. 2 is a block diagram illustrating internal components of an electronic device, according to another embodiment.

FIG. 2 is a block diagram of internal components of an electronic device 101, according to another embodiment.

A device 101 may include a wireless communication unit 110, an audio/video (A/V) input unit 120, a user input unit 130, a buffer 140, a memory 150, an output unit 160, an interface unit 170, a digital signal processing unit 180, and a power supply unit 190. When the elements are actually implemented, two or more elements may be united into one element, or one element may be divided into two or more elements.

The wireless communication unit 110 may include a broadcast receiving module 111, a mobile communication module 112, a wireless Internet module 113, a short distance communication module 114, and a GPS module 115.

The mobile communication module 112 transmits and receives a radio signal to and from at least one of a base station, an external terminal, and a server on a mobile communication network. Here, the radio signal may include a voice call signal, a video call signal, or various forms of data in accordance with character/multimedia message transmission and reception.

The wireless Internet module 115 refers to a module for wireless Internet access and may be mounted in or outside the electronic device 101, which may be a portable device. Wireless local area network (WLAN) Wi-Fi, wireless broadband (WiBro), world interoperability for microwave access (WiMAX), and high-speed downlink packet access (HSDPA) may be used as a wireless Internet technology.

The A/V input unit 120 for inputting an audio signal or a video signal may include a camera 121 and a microphone 123. The camera 121 processes an image frame such as a still image, a continuous photographing image, or a moving picture obtained by an image sensor in a video call mode or a photographing mode. The processed image frame may be displayed on a display unit 161.

The image frame processed by the camera 121 may be stored in the buffer 140 until image processing is completed and may be provided with a file name to be stored in the memory 150 when the image processing is completed. A structure of the image frame will be described in detail with reference to FIGS. 3 and 4A to 4C. In this process, the image frame processed by the camera 121 may be transmitted to the outside through the wireless communication unit 110.

The user input unit 130 generates key input data input by a user to control an operation of the device 101. The user input unit 130 may be formed of a key pad, a dome switch, or a touch pad (resistive/capacitive) that may receive a command or information by a push or touch manipulation of the user. In addition, the user input unit 130 may be formed of a jog wheel that rotates a key, a joystick, or a finger mouse.

The memory 150 may include at least one type of storage medium selected from a flash memory type, a hard disk type, a micro multimedia card type, a card type memory (for example, an SD or XD memory), a random access memory (RAM), and a read only memory (ROM). In addition, the portable device 101 may manage web storage that performs a storage function of the memory 150 on the Internet. Since functions of the buffer 140 and the memory 150 are actually the same as or similar to those of the buffer 40 and the storage unit 50 illustrated in FIG. 1, the detailed explanation of the buffer and the storage unit will not be repeated.

The output unit 160 outputs an audio signal, a video signal, or an alarm signal. The output unit 160 may include a display unit 161, a sound output module 163, an alarm unit 165, and a haptic module 167.

The display unit 161 displays and outputs information processed by the portable device 101.

The interface unit 170 interfaces with all external devices connected to the portable device 101. The external devices connected to the portable device 101 may be, for example, wired/wireless headsets, an external charger, wired/wireless data ports, card sockets such as a memory card socket, a subscriber identification module (SIM) card socket, a user identity module (UIM) card socket, an audio input/output (I/O) port, a video I/O port, and an earphone.

The interface unit 170 may receive data or power from the external devices and may transmit the received data or power to the respective elements in the portable device 101. The interface unit 170 may also transmit data of the portable device 101 to the external devices.

The digital signal processing unit 180 commonly controls operations of the respective elements to control an entire operation of the portable device 101. For example, the digital signal processing unit 180 performs control and processing for a voice call, data communications, and a video call. In addition, the digital signal processing unit 180 may include an image processing unit 182 for processing an image signal transmitted by the camera 121 of the A/V input unit 120.

In addition, the digital signal processing unit 180 may include a multimedia reproduction module 181 for reproducing multimedia. The multimedia reproduction module 181 may be formed of hardware in the digital signal processing unit 180 and may be formed of software to be independent of the digital signal processing unit 180.

FIG. 3 is a block diagram illustrating internal components of a digital signal processing unit that controls a buffer and a storage unit, according to an embodiment. FIGS. 4A to 4C illustrate an embodiment in which a quick change to a playback mode is made after an electronic device photographs a subject. FIG. 5 is a flowchart illustrating a method of making a quick change to a playback mode after an electronic device photographs a subject.

Figure 4:
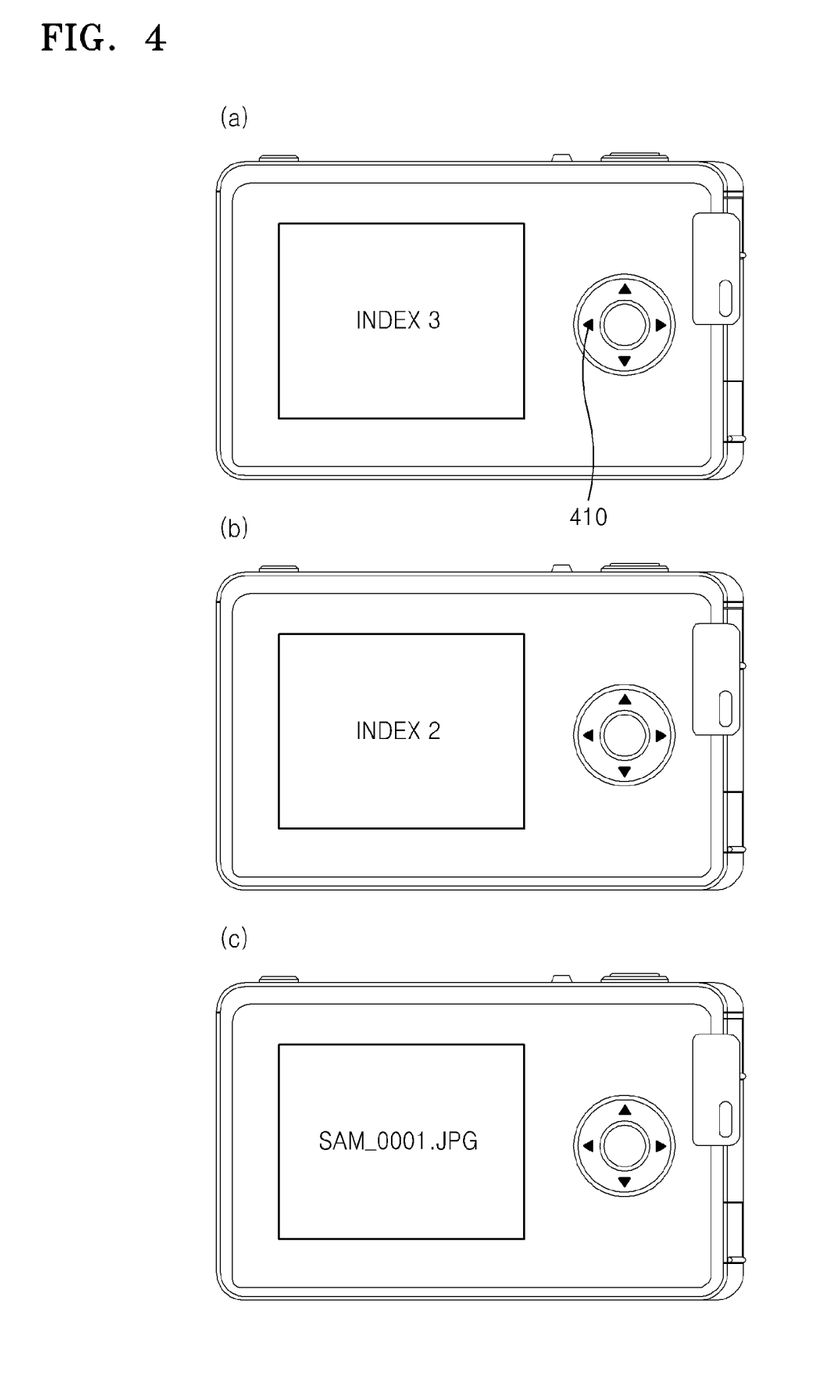
FIGS. 4A to 4C are diagrams illustrating an embodiment in which a quick change to a playback mode is made after an electronic device photographs a subject.
Figure 5:
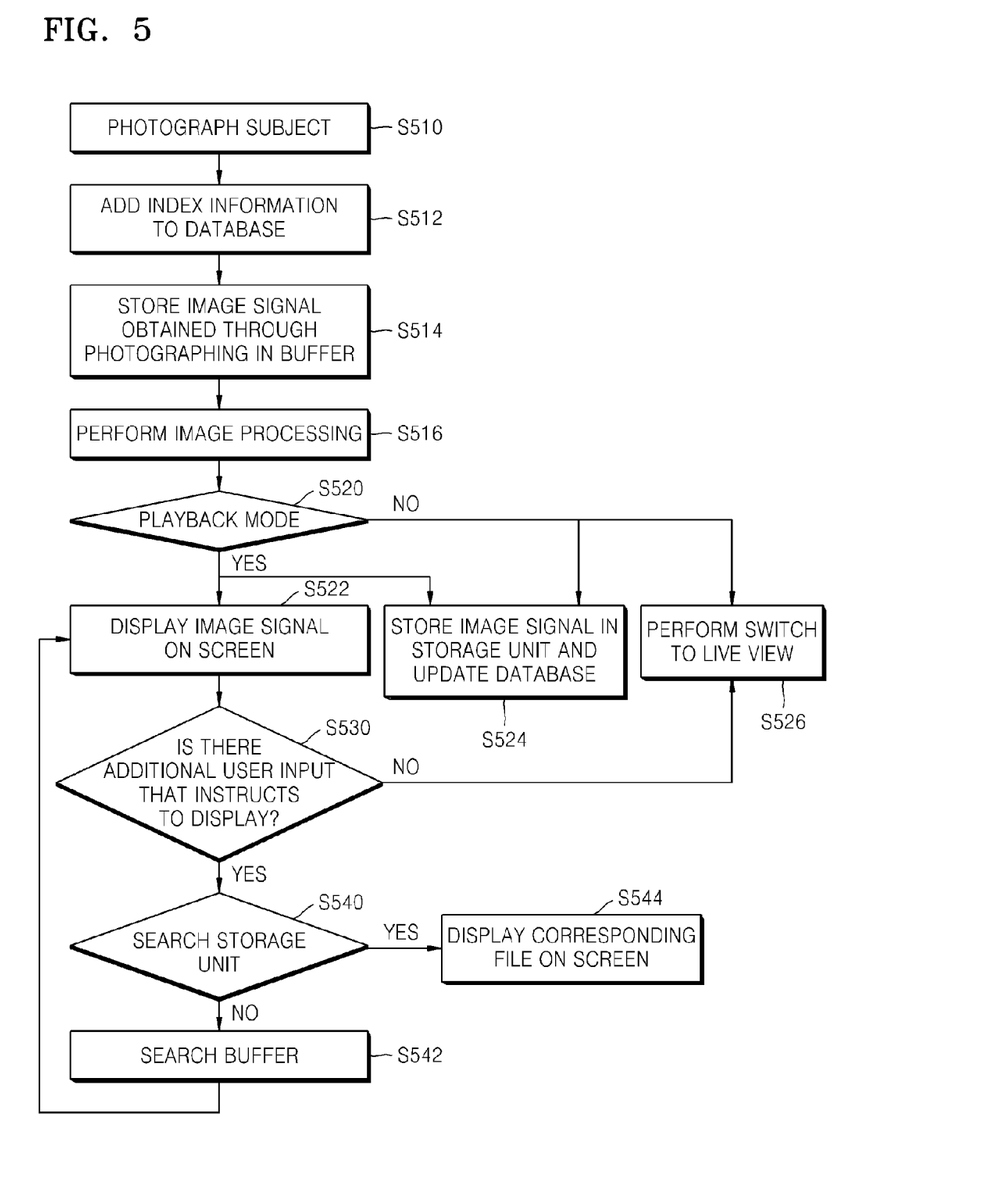
FIG. 5 is a flowchart illustrating a method of making a quick change to a playback mode after an electronic device photographs a subject, according to an embodiment.

Referring to FIGS. 3 to 5, a portable device, such as the digital camera 100 (FIG. 1) or the portal electronic device 101 (FIG. 2), photographs a subject in operation S510. In this case, various photographing modes, such as a still image photographing mode, a continuous photographing mode, and a moving picture photographing mode, may be supported.

The database 341 (FIG. 3) in the buffer 340 (FIG. 3) provides index numbers 342 to respective captured image signals and, after image processing is performed, provides a file name "SAM_0001.JPG" to an image signal having a corresponding index number and a file storage path 343 "I:\DCIM\100PHOTO\SAM_0001.JPG" that represents a position in which the image signal is to be stored in the storage unit 350 (FIG. 3).

The buffer 340 (FIG. 3) temporarily stores at least one image signal obtained through photographing until image processing is completed. When the image processing is completed, the digital signal processing unit 380 (FIG. 3) compresses a corresponding image signal, provides a file name (for example, "SAM_0001.JPG") to the compressed image signal, and stores the compressed image signal provided with the file name "SAM_0001.JPG" in the storage unit 350 (FIG. 3) in operations S512, S514, and S516.

When the device receives an input from a user, such as a playback mode that instructs the display of a currently captured image during photographing in operation S520, the digital signal processing unit 380 (FIG. 3) searches the buffer 340 (FIG. 3) to display an image signal 344 (FIG. 3) provided with "index number 3", which is finally stored in the buffer 340 (i.e., the last image signal to be stored in the butter 340), on a screen as illustrated in FIG. 4A in operation S522.

In this case, the digital signal processing unit 380 (FIG. 3) simultaneously performs background work including storing the corresponding image signal in the storage unit 350 (FIG. 3) and updating the database 341 (FIG. 3) in operation S524.

If there is no additional input from the user, a switch to a live view is performed in operation S526.

When the user checks the currently captured image and presses a previous image view button 410 (FIG. 4A) in order to additionally view a previous image in operation S530, the digital signal processing unit 380 determines whether the corresponding image is stored in the storage unit 350 (FIG. 3) in operation S540. If there is no additional input from the user, switching is performed to a live view in operation S526.

Referring to FIGS. 3 and 4B, when the digital signal processing unit 380 (FIG. 3) does not find a file to be provided with "index number 2" and stored as "SAM_0002.JPG" in the storage unit 350 (FIG. 3) in operation S542, the digital signal processing unit 380 (FIG. 3) searches the database 341 (FIG. 3) 345, loads an image signal 346 corresponding to the "index number 2", and displays the loaded image signal on the screen in operation S522.

When the user desires to additionally check the previous image in operation S530, the digital signal processing unit 380 (FIG. 3) determines whether the corresponding image "SAM_0001.JPG" is stored in the storage unit 350 (FIG. 3) in operation S540. When the file "SAM_0001.JPG" is found in the storage unit 350 (FIG. 3), the digital signal processing unit 380 (FIG. 3) loads the file "SAM_0001.JPG" stored in the storage unit 350 (FIG. 3) to display the loaded file "SAM_0001.JPG" on the screen as illustrated in FIG. 4C, in operation S544.

According to still another embodiment, when the device receives an input from a user that instructs to transmit a currently captured image to another device during photographing, the digital signal processing unit 380 (FIG. 3) searches the buffer 340 (FIG. 3) and loads the image signal 344 (FIG. 3) finally stored in the buffer 340 (i.e., the last image signal to be stored in the butter 340) to transmit the loaded image signal to another device as illustrated in FIG. 4A. In order to transmit the corresponding file or image signal to the other device, according to an embodiment, Wi-Fi communication may be used. When the user desires to additionally transmit a previous image, the digital signal processing unit determines whether the corresponding image is stored in the storage unit 350 (FIG. 3).

Referring to FIGS. 3 and 4B, if the digital signal processing unit 380 (FIG. 3) does not find a file to be provided with the "index number 2" and stored as the "SAM_0002.JPG" in the storage unit 350 (FIG. 3), the digital signal processing unit 380 (FIG. 3) searches the database 341 (FIG. 3), loads the image signal 345 corresponding to the "index number 2", and transmits the loaded image signal to the other device.

When the user desires to additionally transmit the previous image, the digital signal processing unit 380 (FIG. 3) determines whether the corresponding image "SAM_0001.JPG" is stored in the storage unit 350 (FIG. 3). If the file "SAM_0001.JPG" is found in the storage unit 350 (FIG. 3), the digital signal processing unit 380 (FIG. 3) loads the file "SAM_0001.JPG" stored in the storage unit 350 (FIG. 3) to transmit the loaded file "SAM_0001.JPG" to the other device as illustrated in FIG. 4C.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A device for making a quick change to a playback mode after photographing a subject, the device comprising:
   a photographing unit that obtains at least one image signal of the subject;
   an image processing unit that performs image processing on the at least one image signal;
   a buffer that stores the at least one image signal while image processing is performed by the image processing unit; and
   a compression unit that compresses the at least one processed image signal stored in the buffer and stores the at least one compressed image signal in a storage unit when image processing is completed by the image processing unit,
   wherein the buffer comprises a database that stores index information to be assigned to the at least one image signal obtained by the photographing unit, file name and storage path information to be provided to the at least one image signal when the at least one image signal is stored in the storage unit, and
   wherein the device further comprises a digital signal processing unit that:
      displays the most recently stored image signal of the at least one image signal stored in the buffer on a screen, when a display input instruction to display a currently captured image during photographing is received,
      searches the storage unit when an input instruction to display images captured prior to the currently captured image is additionally received,
      when a corresponding image file is found in the storage unit, loads the found image file to display on the screen, and
      when the corresponding image file is not found in the storage unit, loads an image signal stored in the buffer to display on the screen using the index information stored in the database.

2. The device of claim 1, wherein the digital signal processing unit transmits the most recently stored image signal of the at least one image signal stored in the buffer, when a transmit input instruction to transmit the currently captured image during photographing is received.

3. The device of claim 2, wherein the digital signal processing unit transmits the most recently stored image signal of the at least one image signal stored in the buffer to another device using wireless communication.

4. The device of claim 1, wherein while the digital signal processing unit searches the storage unit or loads the stored image signal or the found image file to display on the screen in accordance with the input instruction, the compression unit:

compresses the at least one image signal stored in the buffer;

provides a file name to the at least one compressed image signal;

stores the at least one compressed image signal provided with the file name when the image processing is completed by the image processing unit.

5. The device of claim 1, wherein the display input instruction comprises selection of a playback mode.

6. The device of claim 1, wherein the database stores link information between the index information and the file name and storage path information to be provided to the at least one image signal, when the at least one image signal is stored in the storage unit.

7. The device of claim 1, wherein the device is a camera.

8. A device comprising:
a photographing unit that continuously captures images via a continuous photographing signal in a continuous photographing mode at predetermined intervals;
an image processing unit that performs image processing on the captured images;
a buffer that stores the captured images while image processing is performed by the image processing unit; and
a compression unit that compresses the processed images and stores the compressed images in a storage unit when the image processing is completed by the image processing unit,
wherein the buffer comprises a database that stores index information on the images captured by the photographing unit, and file name and storage path information to be provided to the images when the images are stored in the storage unit, and
wherein the device further comprises a digital signal processing unit that:
displays the most recently stored image of the images stored in the buffer on a screen, when a display input instruction to display a currently captured image during photographing is received,
searches the storage unit when an input instruction to display images captured prior to the currently captured image is additionally received,
when a corresponding image file is found in the storage unit, loads the found image file to display on the screen, and
when the corresponding image file is not found in the storage unit, loads an image signal stored in the buffer to display on the screen using the index information stored in the database.

9. The device of claim 8, wherein the digital signal processing unit transmits the most recently stored image of the images stored in the buffer, when a transmit input instruction to transmit the currently captured image during photographing is received.

10. The device of claim 9, wherein the digital signal processing unit transmits the most recently stored image of the images stored in the buffer to another device using wireless communication.

11. The device of claim 8, wherein while the digital signal processing unit searches the storage unit in accordance with the input instruction, the compression unit:
compresses the images stored in the buffer;
provides file names to the compressed images; and
stores the compressed images provided with the file names when image processing is completed by the image processing unit.

12. A method of making a quick change to a playback mode after a device photographs a subject, the method comprising:
obtaining, by a photographing unit, at least one image signal of the subject;
performing, by an image processing unit, image processing on the at least one image signal;
storing, in a buffer, the at least one image signal while image processing is performed by the image processing unit;
compressing, by a compression unit, the at least one processed image signal stored in the buffer;
providing, by the compression unit, a file name to the at least one compressed image signal;
storing, in a storage unit, the at least one compressed image signal provided with the file name when image processing is completed by the image processing unit;
storing, in a database in the buffer, index information to be provided to the at least one image signal obtained by the photographing unit, and file name and storage path information to be provided when the at least one image signal having the corresponding index information is stored in the storage unit;
displaying, by a digital signal processing unit, the most recently stored image signal of the at least one image signal stored in the buffer on a screen, when a display input instruction to display a currently captured image during photographing is received;
searching, by the digital signal processing unit, the storage unit when an input instruction to display images captured prior to the currently captured image is additionally received;
when a corresponding image file is found in the storage unit, loading the image file to display on the screen; and
when the corresponding image file is not found in the storage unit, loading an image signal stored in the buffer to display on the screen using the index information of the database.

13. The method of claim 12, further comprising:
transmitting, by the digital signal processing unit, the most recently stored image signal of the at least one image signal stored in the buffer when an input instruction to transmit the currently captured image during photographing is received.

14. The method of claim 13, further comprising:
transmitting, by the digital signal processing unit, the most recently stored image signal of the at least one image signal stored in the buffer to another device using wireless communication.

15. The method of claim 12, wherein while the searching step is performed by the digital signal processing unit, the method further comprises:
compressing, by the compression unit, the at least one image signal stored in the buffer;
providing, by the compression unit, a file name to the at least one compressed image signal; and
storing, in the storage unit, the at least one compressed image signal provided with the file name when the image processing is completed by the image processing unit.

16. A method of making a quick change to a playback mode after a device photographs a subject, the method comprising:
continuously capturing images, by a photographing unit, via a continuous photographing signal in a continuous photographing mode at predetermined intervals;
performing, by an image processing unit, image processing on the captured images;
storing, in a buffer, the captured images while image processing is performed by the image processing unit;
compressing, by a compression unit, the processed images;

storing, in a storage unit, the compressed images when the image processing is completed by the image processing unit;

storing, in a database in the buffer, index information on the images captured by the photographing unit, and file name and storage path information to be provided to the images when the images are stored in the storage unit;

displaying, by a digital signal processing unit, the most recently stored image of the images stored in the buffer on a screen when a display input instruction to display a currently captured image during photographing is received;

searching, by the digital signal processing unit, the storage unit when an input instruction to display images captured prior to the currently captured image is additionally received;

when a corresponding image file is found in the storage unit, loading the found image file to display on the screen; and when the corresponding image file is not found in the storage unit, loading an image signal stored in the buffer to display on the screen using the index information of the database.

* * * * *